United States Patent
Best (10) Patent No.: US 7,535,958 B2
(45) Date of Patent: May 19, 2009

(54) HYBRID WIRED AND WIRELESS CHIP-TO-CHIP COMMUNICATIONS

(75) Inventor: Scott C Best, Palo Alto, CA (US)

(73) Assignee: Rambus, Inc., Los Altos, CA (US)

( * ) Notice: Subject to any disclaimer, the term of this patent is extended or adjusted under 35 U.S.C. 154(b) by 688 days.

(21) Appl. No.: 10/867,335

(22) Filed: Jun. 14, 2004

(65) Prior Publication Data

US 2005/0276322 A1 Dec. 15, 2005

(51) Int. Cl.
H03K 7/04 (2006.01)
(52) U.S. Cl. .................. 375/239; 375/256; 375/130; 375/354
(58) Field of Classification Search ............ 375/239, 375/130, 256, 354
See application file for complete search history.

(56) References Cited

U.S. PATENT DOCUMENTS

| | | | |
|---|---|---|---|
| 3,155,102 A | 11/1964 | Niederer, Jr. et al. | |
| 3,638,121 A | 1/1972 | Spilker, Jr. | |
| 3,922,491 A | 11/1975 | Bjork et al. | |
| 4,384,354 A | 5/1983 | Crawford et al. | |
| 4,556,866 A * | 12/1985 | Gorecki | 375/272 |
| 4,648,133 A | 3/1987 | Vilnrotter | |
| 5,111,208 A | 5/1992 | Lopez | |
| 5,122,978 A | 6/1992 | Merrill | |
| 5,243,626 A | 9/1993 | Devon et al. | |
| 5,436,908 A | 7/1995 | Fluker et al. | |
| 5,485,490 A | 1/1996 | Leung et al. | |
| 5,511,091 A | 4/1996 | Saito | |
| 5,523,760 A | 6/1996 | McEwan | |
| 5,548,146 A | 8/1996 | Kuroda et al. | |
| 5,554,945 A | 9/1996 | Lee et al. | |
| 5,621,913 A * | 4/1997 | Tuttle et al. | 455/41.2 |
| 5,742,798 A * | 4/1998 | Goldrian | 713/400 |
| 5,859,881 A | 1/1999 | Ferraiolo et al. | |
| 6,047,346 A | 4/2000 | Lau et al. | |
| 6,163,570 A | 12/2000 | Olafsson | |
| 6,173,345 B1 | 1/2001 | Stevens | |
| 6,219,384 B1 | 4/2001 | Kliza et al. | |
| 6,282,210 B1 | 8/2001 | Rapport et al. | |

(Continued)

FOREIGN PATENT DOCUMENTS

JP 20000035831 8/1990

OTHER PUBLICATIONS

Iyer, "Wireless chip to chip interconnection for multichip modules using leaky wave antennas" Electronics Letters, vol. 29, Issue 23, Nov. 11, 1993, pp. 2030-2031.*

(Continued)

*Primary Examiner*—Juan A Torres
(74) *Attorney, Agent, or Firm*—Haynes Beffel & Wolfeld LLP (57) ABSTRACT

A hybrid wireless and wired system distributes precise timing and synchronization information among the nodes over a wired interconnect structure while data is transmitted wirelessly using ultra-wideband radio over short distances. The timing information communicated over the wired interconnect structure is used to establish a baseline timing reference for the wireless transmitters, receivers and transceivers on the nodes of the communication network. Using a common timing reference, a mesochronous communication system is established for chip-to-chip wireless data transmission.

32 Claims, 3 Drawing Sheets

U.S. PATENT DOCUMENTS

| | | | |
|---|---|---|---|
| 6,321,282 | B1 | 11/2001 | Horowitz et al. |
| 6,359,931 | B1 | 3/2002 | Perino et al. |
| 6,369,652 | B1 | 4/2002 | Nguyen et al. |
| 6,377,640 | B2 | 4/2002 | Trans |
| 6,396,329 | B1 | 5/2002 | Zerbe |
| 6,421,389 | B1 | 7/2002 | Jett et al. |
| 6,434,081 | B1 | 8/2002 | Johnson et al. |
| 6,442,644 | B1 | 8/2002 | Gustavson et al. |
| 6,448,815 | B1 | 9/2002 | Talbot et al. |
| 6,456,221 | B2 * | 9/2002 | Low et al. ............... 341/157 |
| 6,463,392 | B1 | 10/2002 | Nygaard et al. |
| 6,469,555 | B1 | 10/2002 | Lau et al. |
| 6,473,439 | B1 | 10/2002 | Zerbe et al. |
| 6,484,232 | B2 | 11/2002 | Olarig et al. |
| 6,510,503 | B2 | 1/2003 | Gillingham et al. |
| 6,539,072 | B1 | 3/2003 | Donnelly et al. |
| 6,556,934 | B2 | 4/2003 | Higashide |
| 6,560,716 | B1 | 5/2003 | Gasparik et al. |
| 6,606,350 | B2 | 8/2003 | Dress, Jr. et al. |
| 6,606,576 | B2 | 8/2003 | Sessions |
| 6,643,787 | B1 | 11/2003 | Zerbe et al. |
| 6,657,468 | B1 | 12/2003 | Best et al. |
| 6,662,305 | B1 | 12/2003 | Salmon et al. |
| 6,690,741 | B1 | 2/2004 | Larrick, Jr. et al. |
| 6,717,992 | B2 | 4/2004 | Cowie et al. |
| 6,889,357 | B1 | 5/2005 | Keeth et al. |
| 2001/0053175 | A1 | 12/2001 | Hoctor et al. |
| 2001/0056332 | A1 | 12/2001 | Abrosimov et al. |
| 2002/0048382 | A1 | 4/2002 | Hou |
| 2002/0072870 | A1 | 6/2002 | Adam et al. |
| 2002/0138224 | A1 | 9/2002 | Sessions |
| 2002/0149824 | A1 | 10/2002 | Beaulieu et al. |
| 2003/0026399 | A1 | 2/2003 | Carlson |
| 2003/0053489 | A1 * | 3/2003 | Zerbe et al. ............. 370/503 |
| 2003/0063597 | A1 | 4/2003 | Suzuki |
| 2003/0146800 | A1 | 8/2003 | Dvorak |
| 2003/0149991 | A1 | 8/2003 | Reidhead et al. |
| 2003/0198212 | A1 | 10/2003 | Hoctor et al. |
| 2003/0198308 | A1 | 10/2003 | Hoctor et al. |
| 2004/0032354 | A1 | 2/2004 | Knobel et al. |
| 2004/0057500 | A1 | 3/2004 | Balachandran et al. |
| 2004/0217881 | A1 | 11/2004 | Pedyash et al. |
| 2005/0163202 | A1 | 7/2005 | Hampel et al. |

OTHER PUBLICATIONS

Drost "Proximity communication", Proceedings of the IEEE 2003 Custom Integrated Circuits Conference, 2003, Sep. 21-24, 2003 pp. 469-472.*

EIA/JEDEC Standard No. 8-B (JESD8-B) "Interface Standard for Nominal 3 V/3.3 V Supply Digital Integrated Circuits," (Sep. 1999) 12 pages.

EIA/JEDEC Standard No. 8-6 (EIA/JESD8-6) "High Speed Transceiver Logic (HSTL) A 1.5 V Output Buffer Supply Voltage Based Interface Standard for Digital Integrated Circuits," (Aug. 1995) 16 pages.

JEDEC Standard—JESD8-16 "Bus Interconnect Logic (BIC) for 1.2 Volts," (Apr. 2004) 16 pages.

Lee, Ming-Ju Edward et al., "TP 15.3: A 90mW 4Gb/s Equalized I/O Circuit with Input Offset Cancellation" IEEE International Solid-State Circuits Conference, pp. 252-253.

Paris, Lluis et al, "WP 24.3 A 800MB/s 72Mb SLDRAM with Digitally-Calibrated DLL," IEEE International Solid-State Circuits Conference (1999), 13 pages.

Nakase, Yasunobu et al, "Source-Synchronization and Timing Vernier Techniques for 1.2-GB/s SLDRAM Interface," IEEE Journal of Solid-State Circuits, vol. 34, No. 4 (Apr. 1999), 494-501.

Gillingham, Peter, "SLDRAM Architectural and Functional Overview," SLDRAM Consortium (Aug. 29, 1997), 1-14.

"Draft Standard for a High-Speed Memory Interface (SyncLink)", Draft 0.99 IEEE P1596.7-199X (1996), 56 pages.

Gillingham, Peter, "SLDRAM: High-Performance, Open-Standard Memory," IEEE (1997), 29-39.

SLDRAM Inc., "400 Mb/s/pin SLDRAM," Draft Advance (Jul. 9, 1998), 1-69.

Zerbe, Jared et al., U.S. Appl. No. 09/776,550, filed Feb. 2, 2001, entitled "Method and Apparatus for Evaluating and Calibrating a Signaling System".

Zerbe, Jared et al, U.S. Appl. No. 09/976,170, filed Oct. 21, 2001, entitled "Method and Apparatus for Evaluating and Optimizing a Signaling System."

Rambus "Direct Rambus Short Channel Layout Guide, Version 0.95" (Aug. 2001), 40 pages.

Rambus "Direct Rambus Long Channel Design Guide" (2000), 45 pages.

Intel "How to Measure RDRAM* System Clock Jitter" Application Note AP-667 (Jun. 1999), pp. 1-15.

RDRAM® Overview, "High Performance Memory Interface Solution", Copyright 2003 Rambus, Inc., all rights reserved, 4 pages.

Redwood Technology Brief "High Performance Parallel Bus Interface Technology", Copyright 2003 Rambus, Inc., all rights reserved, 2 pages.

Lewis, Dave, "Easy-to-Use LVDS Serdes for the Serdes Neophyte" National Semiconductor, (Jun. 16, 2003), pp. 1-5.

U.S. Appl. No. 10/278,478, filed Oct. 22, 2002 entitled "Timing Calibration Apparatus and Method for a Memory Device Signaling System".

Chang, Kun Yung "Design of a CMOS Asymmetric Serial Link" A Dissertation Submitted to the Department of Electrical Engineering and the Committee on Graduate Studies of Stanford University Aug. 1999, 119 pages.

U.S. Appl. No. 10/278,708, filed Oct. 22, 2002, entitled "Phase Adjustment Apparatus and Method for a Memory Device Signaling System."

Daniele, N. et al., "Principle and Motivations of UWB Technology for High Data Rate WPAN Applications," SOC 2003, 4 pages.

Win, Moe Z., et al.,"Impulse Radio:How it Works," IEEE Communications Letters 2(2), Feb. 1998, 36-38.

Daniele, Norbert, "Ultra Wide Band Principles and Applications for Wireless Communications," CEA-LETI Annual Review, Jun. 25-26, 2002, 24 pages.

Rambus, Inc. "RDRAM Direct Rambus Clock Generator" (Apr. 2002), 22 pages.

U.S. Appl. No. 09/941,079, filed Aug. 28, 2001 entitled "Clock Data Recovery with Selectable Phase Control Input."

RaSer™ X Product Brief, "Highly Flexible 10 Gbps Backplane Serial Link Interface," Copyright 2003 Rambus, Inc., all rights reserved, 2 pages.

Yellowstone Technology Brief, "High Performance Memory Interface Technology," Copyright 2003 Rambus, Inc., all rights reserved, 2 pages.

Widmer, A.X., et al., "A DC-Balanced, Partitioned-Block, 8B/10B Transmission Code," IBM J. Res. Develop., vol. 27, No. 5, Sep. 1983, 440-451.

Banu, Mihai, et al., "TA 6.4: A 660Mv/s CMOS Clock Recovery Circuit with Instantaneous Locking for NRZ Data and Burst-Mode Transmission," IEEE International Solid State Circuits Conference, 1993, 102-103, 270.

Eldering, Charles A., et al., "Digital Burst Mode Clock Recovery Technique for Fiber-Optic Systems, " Journal of Lightwave Technology, vol. 12, No. 2, Feb. 1994, 271-279.

Chang, Ken K. Y., et al., "A 2 Gb/s Asymmetric Serial Link for High-Bandwidth Packet Switches," Hot Interconnects V, Stanford University, Aug. 1997, 1-9.

Hu, Timothy H., et al., "A Monolithic 480 Mb/s Parallel AGC/Decision/Clock-Recovery Circuit in 1.2- * CMOS, " IEEE Journal of Solid-State Circuits, vol. 28, No. 12, Dec. 1993, 1314-1320.

Kim, Sungjoon, et al, "An 800Mbps Multi-Channel CMOS Serial Link with 3x Oversampling,"IEEE 1995 Custom Integrated Circuits Conference, 22.7.1-22.7.4.

Nakamura, Kazuyuki, et al., "A 6 Gbps CMOS Phase Detecting DEMUX Module Using Half-Frequency Clock, " 1998 Symposium on VLSI Circuits Digest of Technical Papers, 196-197.

Poulton, John, et al., A Tracking Clock Recovery Receiver for 4Gb/s Signaling, Hot Interconnects '97, Aug. 21-23, 1997, Palo Alto, CA, 1-13.

Dally, W, et al., "Digital Systems Engineering," Cambridge University Press, 1998, pp. 447-449.

Cerisola, M., et al., "CORD—a WDM Optical Network: Control Mechanism Using Subcarrier Multiplexing and Novel Synchronization Solutions," Communications, 1995. ICC 95 Seattle, Gateway to Globalization, 1995 IEEE International Conference on, vol. 1, Jun. 18-22, 1995 pp. 261-265 vol. 1.

Yang, Chih-Kong Ken "Design of High-Speed Serial Links in CMOS" Technical Report No. CSL-TR-98-775, Sponsored By Center for Integrated Systems, Sun Microsystems and LSI Logic Inc. Dec. 1998, pp. 1-182.

* cited by examiner

HYBRID WIRED AND WIRELESS CHIP-TO-CHIP COMMUNICATIONS

BACKGROUND OF THE INVENTION

1. Field of the Invention

The present invention relates to wireless, chip-to-chip communications adapted for transferring data for integrated circuits mounted within a support structure like a chassis or a printed circuit board; and more particularly to so-called impulse radio or ultra-wideband (UWB) radio channels adapted for such use.

2. Description of Related Art

UWB radio systems have been proposed for wireless chip-to-chip communications systems. One example technique for such use is pulse position modulation (PPM) for communication of data. Unlike the typical narrowband radio systems which require heterodyne receiver architectures, a UWB radio system requires a simpler "correlator" circuit which consumes less power and less circuit area, and can be integrated with standard bulk CMOS processes. For reference, see N. Daniele, et al., "Principle and Motivations of UWB Technology for High Data Rate WPAN Applications," *Smart Objects Conference*, May 15-17, 2003, Grenoble, France; and Win, et al., "Impulse Radio: How It Works," *IEEE Communications Letters*, Vol. 2, No. 2, February, 1998.

Also, as described by Daniele, et al., unlike narrowband systems, the theoretical channel capacity of a UWB system increases exponentially as the distance between transmitter and receiver is reduced. According to this characteristic multi-channel, multi-gigabit-per-second Gbps signaling over the distance of a few centimeters is possible.

However, a significant drawback for UWB systems, compared with sinusoidal radio systems, is the requirement of a precise timing source at both the transmitter and the receiver. This requirement can be understood in the context of a PPM system by considering that to distinguish between a transmitted "0" and a transmitted "1," a UWB receiver needs to be able to distinguish the position of a received Gaussian mono-cycle pulse with accuracy on the order of less than 100 picoseconds in a representative embodiment.

Some of the basic principles of pulse position modulation are also described by Daniele, et al. In a PPM scheme, a transmitted pulse is transmitted during a given timing slot from a transmitter, and is received at a receiver after a nominal pulse interval NPI, corresponding with the time of flight of the transmitted pulse from the transmitter to the receiver. The signal is modulated to indicate a logic "0" and a logic "1" by transmitting either early or late. Thus, a logic "0" is received early with respect to the NPI at the receiver, and a logic "1" is received late. The amount of the shift in time between the early and late pulses is very small, such as on the order of 100 picoseconds in some systems.

A typical process of receiving the transmitted PPM pulse is also described in Daniele, et al. Logic "0" and logic "1" PPM modulation positions are shifted in phase from a nominal sample time. The received signals are combined with a correlation pattern aligned with the nominal sample time, and in some systems integrated over a number of samples, to produce a detector output. For example, one correlation pattern described in the Daniele, et al. article is set up so that if the received pulse is a logic "0," then the result of multiplication with the correlation pattern will be positive. On the other hand, if the received pulse is a logic "1," then the result of multiplication with the correlation pattern will be negative. As can be appreciated, if the correlation pattern is misaligned with respect to the nominal sample time, the correlation with early and late pulses becomes distorted, and significant receiver error will occur. This makes UWB systems highly sensitive to timing imperfections, which are difficult to overcome in low-cost systems.

It is desirable to provide techniques for chip-to-chip communication using UWB and other wireless technologies, which provide more efficient utilization of system resources, and overcome the problems of timing imperfections encountered in the prior art.

SUMMARY

An embodiment of a "hybrid" wireless and wired system in which precise timing information is communicated from node to node over a wired interconnect structure while data is transmitted wirelessly is described. The timing information communicated over the wired interconnect structure is used to establish a baseline timing reference for the wireless transmitters, receivers and transceivers on the nodes of the communication network. Using a common timing reference, a mesochronous communication system is established for wireless data transmission. Examples of "wired interconnect structures" include typical electronic and opto-electronic interconnects like backplane bus cables, printed circuit board wiring, twisted-pair cabling, coaxial cabling, fiber-optic cabling, conductor patterns on integrated circuits, power supply cabling and so on. Described systems communicate data wirelessly using wideband and ultra-wideband radio with protocols including but not limited to pulse position modulation.

A method is described for wireless communication between a first node and a second node comprising:

delivering a timing reference signal via a wired interconnect structure to the first node and the second node;

transmitting a radio signal, such as an ultra-wideband radio signal, in response to the timing reference signal at the first node, the radio signal carrying data by for example a pulse position modulation protocol; and receiving the radio signal in response to the timing reference signal at the second node.

The timing of at least one of a transmit timing signal and the receive timing signal can be adjusted to coordinate communication between the first and second nodes. In some embodiments, a synchronization process is executed to set at least one of a transmit drive point at the first node and a receive sample point at the second node. A control signal related to the synchronization process can be communicated between the first and second nodes via the wired interconnect structure as well, in some embodiments. Adjustment of the transmit timing signal and the receive timing signal in various embodiments is made in increments of 10 picoseconds or less, and as finely as 1 picosecond or less, to provide precise timing alignment and mesochronous synchronization for the wireless radio channel. In some embodiments, wireless communication is bidirectional, so that the communication method includes transmitting a radio signal at the second node, and receiving the radio signal at the first node. Also, in some embodiments, a plurality of wireless communication channels are established between the first and second nodes, providing for high-speed parallel wireless links, which exploit large spatial capacity of systems like UWB radio, and which share the timing information distributed via the wired interconnect structure.

Processes for adjusting timing of the transmit and/or receive timing signals include producing a phase-locked clock signal in response to the timing reference signal on the node, providing a source for a plurality of phase shifted copies of the phase-locked clock signal, and selecting one of the plurality of phase shift copies in response to a control parameter. For example, in some systems the phase-locked clock signal has a frequency greater than 1 gigahertz and more than 50 phase shifted copies of the phase-locked clock signal are available to be selected as timing references. In one embodiment, a timing reference signal is multiplied in frequency to provide a phase-locked clock signal with a frequency on the order of 3.9 GHz on the first and second nodes, and circuitry is provided to produce 256 phase shifted copies, giving resolution on the order of one picosecond for adjustment of one, or both, of the transmit drive signal and the receive sample signal. Higher frequencies and larger numbers of phase samples can achieve even greater adjustment precision.

Some embodiments of the methods described include generating the timing reference signal at one of the first and second nodes. Alternative embodiments include generating the timing reference signal at a third location which is coupled to the wired interconnect structure.

Apparatus disclosed herein is adapted for communication in systems where the first and second nodes comprise circuits on first and second integrated circuits which are separated by a distance of less than two meters, and in some embodiments by distances of less than one half meter, such as integrated circuits on boards mounted in a common chassis interconnected by a backplane, and integrated circuits on a single printed circuit board interconnected by traces on the printed circuit board.

Disclosed herein is an embodiment where a system includes a first integrated circuit and a second integrated circuit. A wired interconnect structure is coupled to the first and second integrated circuits. A clock circuit is coupled to the wired interconnect structure, and transmits a timing reference signal on the wired interconnect structure. The first integrated circuit includes a data source and a radio transmitter, such as an ultra-wideband, pulse position modulation transmitter. A timing reference signal input on the first integrated circuit is adapted to receive the timing reference signal from the wired interconnect structure. A timing circuit produces a transmit timing signal in response to the timing reference signal. The radio transmitter is coupled to the transmit timing circuit and the data source, and transmits a radio signal carrying data from the data source in response to the transmit timing signal.

The second integrated circuit includes a timing reference signal input adapted to receive the timing reference signal from the wired interconnect structure. A receive timing circuit produces a receive timing signal in response to the timing reference signal. A radio receiver on the second integrated circuit is coupled to the receive timing circuit, and receives the radio signal carrying data from the data source in response to the receive timing signal.

In some embodiments of the systems and methods described, the communication is bidirectional, so that there is a radio transmitter on the second integrated circuit and a radio receiver on the first integrated circuit. Likewise, the communication comprises parallel, multichannel wireless communication in some embodiments, in which there are a plurality of transceivers on each of the first and second integrated circuits.

Circuitry on the first and second integrated circuits is included for adjusting transmit timing signals and receive timing signals relative to the timing reference signal received from the wired interconnect structure. In some embodiments at least one of the first and second integrated circuits includes logic which executes a synchronization process for the purposes of establishing an amount of adjustment needed, and for executing the adjustment. Likewise, in some embodiments, synchronization control signals are transmitted and received by the first and second integrated circuits via the wired interconnect structure.

Fine adjustment of the timing of transmit timing signals and receive timing signals is achieved in some embodiments using an adjustment circuit on at least one of the first and second integrated circuits. An adjustment circuit according to one example embodiment comprises a phase locked loop which produces a phase locked clock signal in response to the timing reference signal, a mixer which provides a source for a plurality of phase shifted copies of the phase locked clock signal, and selection circuitry adapted to select one of the plurality of phase shifted copies in response to a control parameter.

Other aspects and advantages of the present described technology can be seen on review of the drawings, the detailed description and the claims, which follow.

DETAILED DESCRIPTION

A detailed description of embodiments of the present technology is provided with reference to the FIGS. 1-4.

Figure 1:
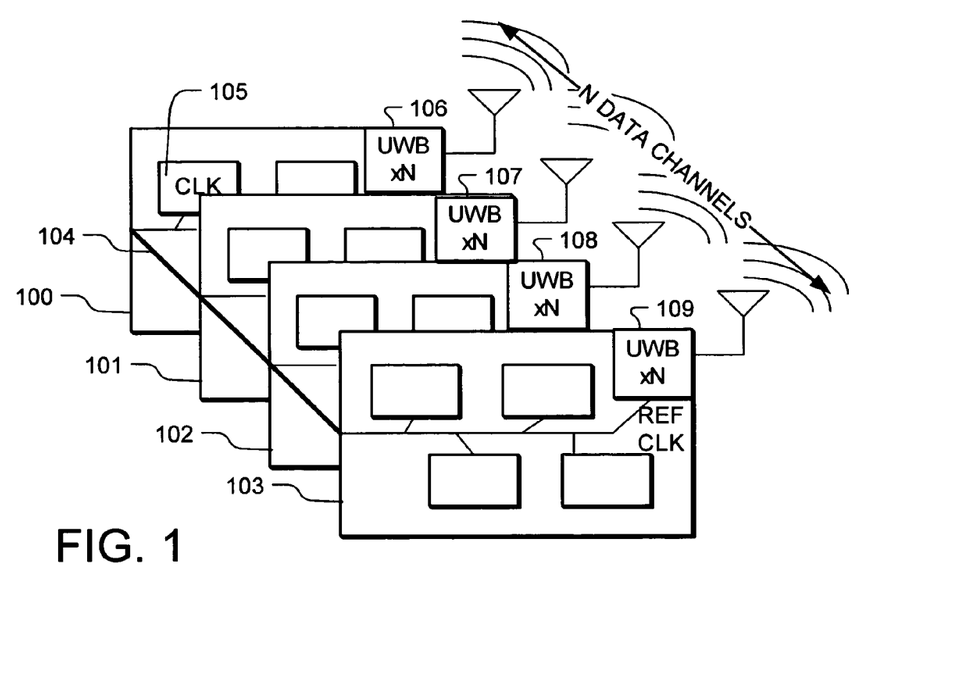
FIG. 1 is a simplified diagram of a system including a plurality of circuit boards with integrated circuits mounted thereon, that communicate by ultra-wideband, wireless radio.

FIG. 1 shows a basic architecture for deployment of a communication system in a high-performance data processing system, that includes a plurality of circuit boards 100-103 interconnected by a wired interconnect structure 104. At least one of the circuit boards, such as board 100, includes a clock circuit 105, which transmits a timing reference signal on the wired interconnect structure 104. Each of the plurality of circuit boards 100-103 includes an ultra-wideband transceiver 106-109. The ultra-wideband transceivers 106-109 are coupled to the timing reference signal on the wired interconnect structure 104, and synchronize transmission and receiving of ultra-wideband signals with reference to the shared timing reference signal. In the embodiment shown, each of the circuit boards 100-103 includes a plurality of ultra-wideband transceivers (xN), establishing a plurality of data channels (N) via the wireless medium. In the example illustrated, the wired interconnect structure includes a backplane bus, circuit board traces, and conductor patterns on an integrated circuit including the clock circuit 105 and on integrated circuits including the ultra-wideband transceivers. The wired interconnect structure may include the existing power-supply network for the system, where the timing reference signal is simply overlayed onto the existing interconnects. That is, a portion of a power supply network or at least one power supply line feeding a power supply voltage to the chips may be overlayed with a higher frequency timing reference. Alternatively, higher accuracy can be achieved by utilizing dedicated wired interconnects for the timing reference signals. Antennas are schematically illustrated to emphasize the wireless nature of the communication system, and can take many configurations, as known in the art.

According to the basic architecture of FIG. 1, the transceivers 106-109, acting as nodes in the communication system, are mounted on circuit boards within a single chassis, for example, and are separated from one another by relatively short distances, such as less than 2 meters. In yet other embodiments the communication can be extended for longer distances, such as across a room, over distances of 10 meters or less. Greater distances are also possible. However, the present technology is particularly useful, but not limited to, relatively short distance communication systems.

Figure 2:
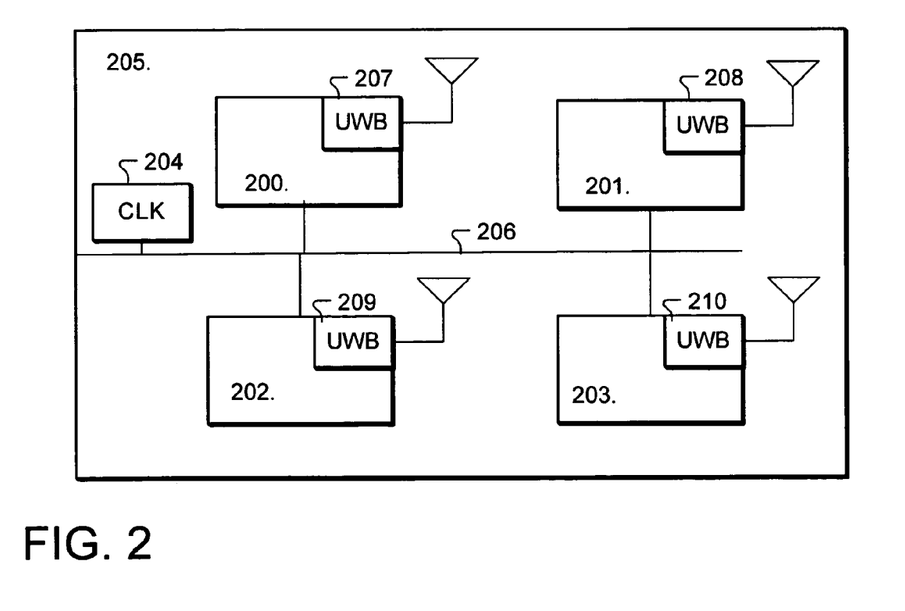
FIG. 2 is a simplified diagram of the system including a plurality of integrated circuits on a single board, that communicate by ultra-wideband, wireless radio.

FIG. 2 illustrates another basic architecture for deployment of a communication system that includes a plurality of integrated circuits 200-204 mounted on a single circuit board 205. One of the integrated circuits 204 comprises a clock circuit which provides a reference clock signal on a wired interconnect structure 206 on the circuit board 205. Integrated circuits 200-203 in the example illustrated include ultra-wideband transceivers 207-210, which generate transmit timing signals and receive timing signals in response to the timing reference signal received from the wired interconnect structure. In the embodiment illustrated, the distances between transceivers which act as nodes in the communication system are quite short, such as less than one half meter.

Figure 3:
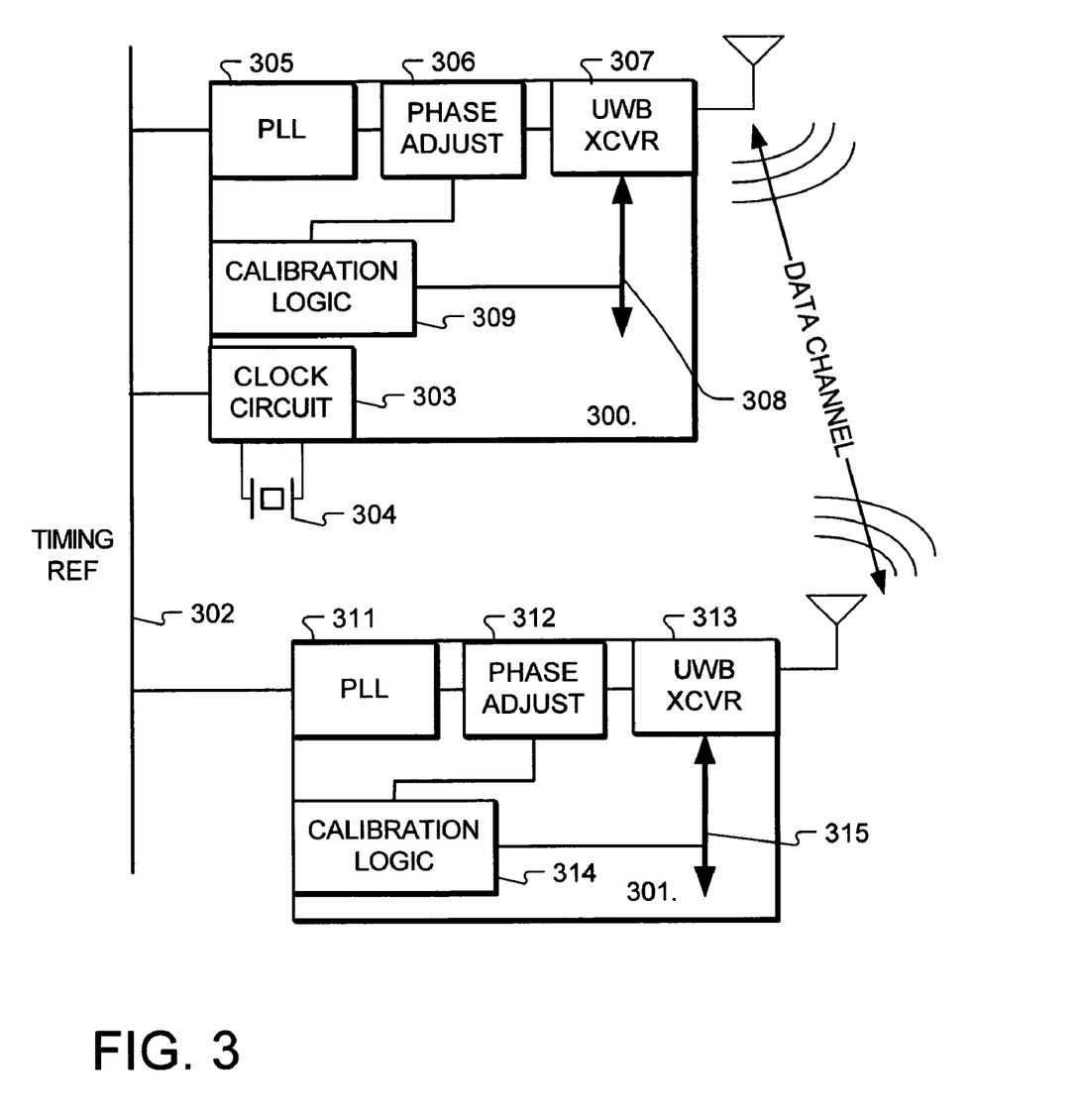
FIG. 3 is a block diagram of a communication system including ultra-wideband transceivers and wired timing reference signals.

FIG. 3 shows a more detailed diagram of a communication system. The system shown in FIG. 3 includes a first integrated circuit 300 and a second integrated circuit 301 which are connected in common to a wired interconnect structure 302 carrying a timing reference signal. Integrated circuit 300 includes a clock circuit 303, which is coupled with a crystal reference 304. A timing reference signal is supplied from a clock circuit 303 onto the wired interconnect structure 302 (including the on chip conductors to the circuitry on the first and second integrated circuits). A phase locked loop circuit 305 on the integrated circuit 300 is adapted to receive the timing reference signal from the wired interconnect structure 302. The output of the phase locked loop is a phase locked clock signal, typically having a frequency which is a multiple of the timing reference signal. A phase adjustment circuit 306 is used to adjust the phase of the phase locked clock signal, and supply a transmit timing signal and a receive timing signal to the ultra-wideband transceiver 307. The ultra-wideband transceiver 307 is coupled to a data source via bus 308, and transmits data from bus 308 via a wireless protocol. Integrated circuit 300 also includes calibration logic 309. Calibration logic 309 causes execution of a synchronization process, described below.

The second integrated circuit 301, likewise includes a phase locked loop circuit 311 which is adapted to receive the timing reference signal from the wired interconnect structure 302. The output of phase locked loop circuit 311 is a phase locked clock signal generated in response to the timing reference signal, and having a frequency which can be the same as, or a multiple of, the frequency of the phase locked clock signal generated by the phase locked loop 305 on the first integrated circuit 300. For example, a master transmitter on one integrated circuit runs at some integer multiple of the frequencies of the PLL's running in each of a plurality of slave devices in some embodiments. The output of the phase locked loop circuit 311 is applied to the phase adjustment circuit 312, which provides transmit timing signals and receive timing signals to the ultra-wideband transceiver 313. The ultra-wideband transceiver 313 on integrated circuit 301 is coupled to a data destination across bus 315. Calibration logic 314 on the integrated circuit 301 cooperates in the synchronization process with the calibration logic 309 on the integrated circuit 300. In some embodiments, control signals for the synchronization process are transmitted and received between the calibration logic 309 and the calibration logic 314 across the wired interconnect structure 302.

In one representative synchronization process, calibration logic 309 transmits a "synch" signal (or "activate calibration" signal) by the wired interconnect structure 302 to the calibration logic 314 on the second integrated circuit 301. This causes the calibration logic 309, 314 to set up for the synchronization process. In a representative embodiment, the calibration logic 314 responds after set up by causing the ultra-wideband transceiver 313 to transmit a calibration sequence to the ultra-wideband transceiver 307 on integrated circuit 300. The calibration logic 309 on integrated circuit 300 sweeps the phase of the receive timing signal for the ultra-wideband transceiver 307 until the receive timing signal matches the time of flight delay between the transmission of a pulse at the ultra-wideband transceiver 313 and the reception of the pulse at the ultra-wideband transceiver 307, and the calibration pattern is successfully received. The calibration logic 309 on integrated circuit 300 then causes the ultra-wideband transceiver 307 to transmit a calibration pattern to the ultra-wideband transceiver 313 on integrated circuit 301. The integrated circuit 301, receives and samples the pattern, using a fixed receive timing signal, and returns the sample data back via the already calibrated return path to the ultra-wideband transceiver 307 on integrated circuit 300. The returned sample data is analyzed to determine whether the calibration pattern is successfully received. If it is not successfully received at the integrated circuit 300, an adjustment in the transmit timing point for the ultra-wideband transceiver 307 is made, and the process iterates until successful transmission and reception of data is accomplished.

The calibration process just described is one example of a synchronization technique that can be used in systems according to the present technology presented herein. A wide variety of synchronization processes could be used depending on the nature of the equipment in which the technology is deployed. For example, in one embodiment, rather than implementing the adjustment of both the transmit timing point and the receive timing point on a master node, the receivers on all nodes are deployed with fixed sample timing points, and transmit timing points are adjusted on all nodes. Also, in systems where there are a plurality of parallel wireless channels, initial calibration and synchronization of the various transceivers includes storage of parameter sets on each of the transceivers needed to establish communications with the various nodes in the system. This initial calibration and synchronization logic is well within the level of skill in the art and not further described.

The wired interconnect structure 302 can be used for communication of other types of synchronization signals, including for example pseudo-noise (PN) codes, which are used for discrimination among the channels in a multichannel system, and for security making intercept of the channel difficult. PN codes are applied by the transmitters and receivers to establish a pattern for the transmission of ultra-wideband pulses.

It will be appreciated that the timing of the transmit timing signal on one node of the communication channel, and the timing of the receive timing signal on another node in the communication channel is critical. For example, for ultra-wideband transceivers that are separated by one meter, an impulse transmitted by one transceiver will arrive at the other transceiver in about three nanoseconds. In pulse position modulation, the position of the pulse is modulated between an early and a late condition to indicate whether the pulse carries a logic "0" or logic "1." The peaks of the early and late pulses may be separated by 100 picoseconds or less, and detection requires even more precise adjustment of the transmit and receive timing. The technology described herein may provide for adjustment of the timing of at least one of the transmit timing signal and the receive timing signal by increments of 10 picoseconds or less, and in some embodiments by increments of one picosecond or less.

Figure 4:
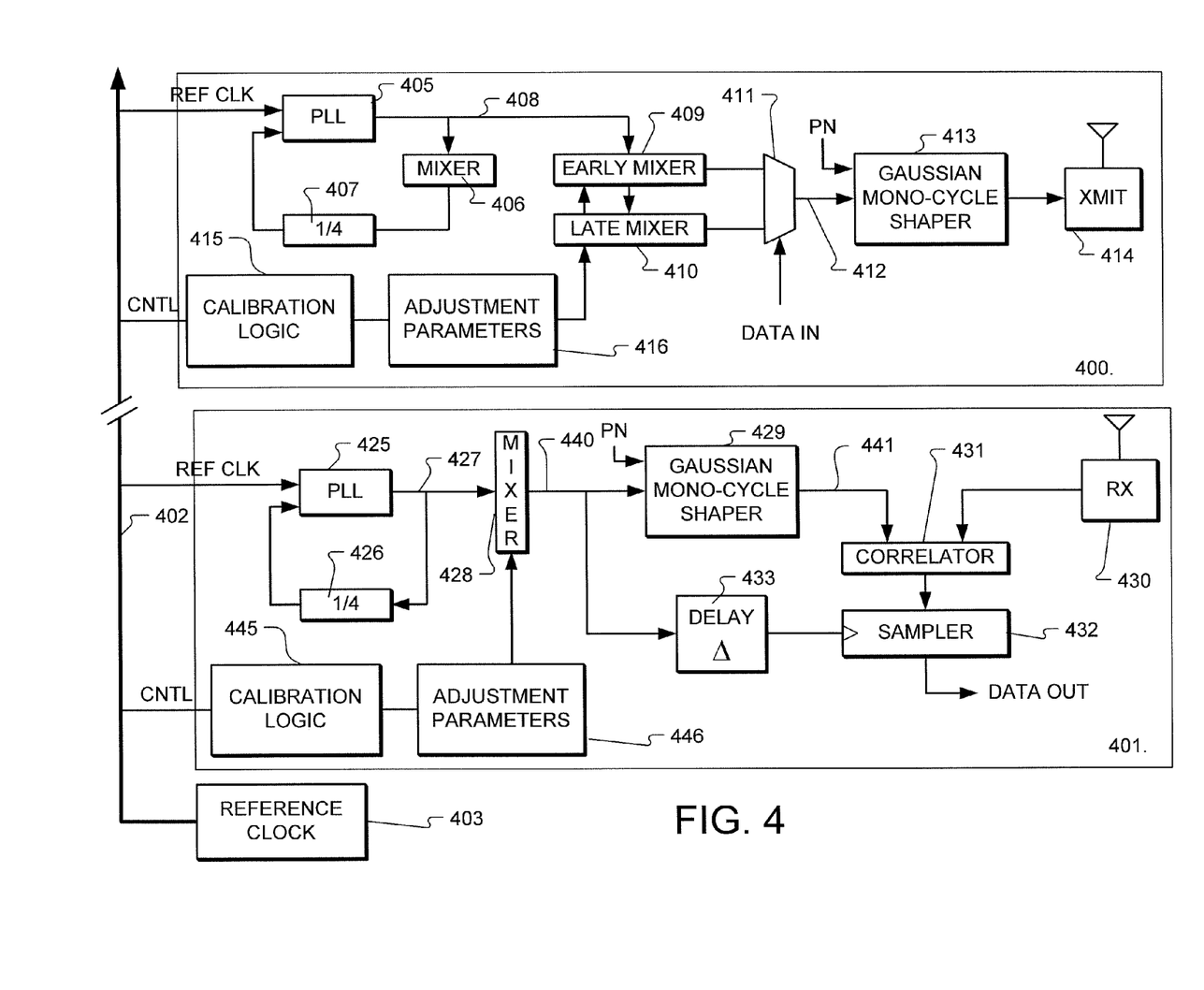
FIG. 4 is a more detailed diagram of system for ultra-wideband, pulse position modulated communication.

FIG. 4 illustrates a schematic block diagram of a pulse position modulated, ultra-wideband communications system. The system includes a first integrated circuit 400 and a second integrated circuit 401 which are interconnected by a wired interconnect structure 402. A reference clock circuit 403 is coupled to the wired interconnect structure 402, and provides a reference clock to the first integrated circuit 400 and to the second integrated circuit 401. In this embodiment, the first integrated circuit 400 includes a transmitter and the second integrated circuit 401 includes a receiver. In other embodiments, the first and second integrated circuits comprise transceivers, including both transmitters and receivers.

In the transmitter on the integrated circuit 400, phase locked loop 405 is adapted to receive the reference clock from the wired interconnect structure 402. The phase locked loop 405 applies its output to a reference mixer 406 and through divider 407 as feedback, to establish a number of phase-shifted clock signals, or other phase reference signals, on line 408, each having a frequency which is a multiple of the timing reference signal, and preferably evenly spaced in phase (like "k-lines" as described below). The phase-shifted clock signals on line 408 are applied to an early mixer 409 and a late mixer 410 for generating timing references for the early pulse corresponding to logic "0," and the late pulse corresponding to logic "1," respectively. The outputs of the early mixer 409 and late mixer 410 are applied to a multiplexer 411 which is responsive to the input data to select the appropriate timing for the output UWB pulse. A timing reference signal which sets the transmit timing point is applied on line 412 at the output of the multiplexer 411 to a Gaussian mono-cycle shaper 413. A pseudo noise code is applied to circuitry that is heuristically part of the shaper 413 in the diagram, in combination with the timing reference signal on line 412. The shaper 413 outputs a mono-cycle pulse or pulse train that is applied to ultra-wideband transmitter 414 for each data signal.

Calibration logic 415 is also coupled to the wired interconnect structure 402. The calibration logic 415 shares control signals, such as an "activate calibration" signal, a PN code signal, and the like, with calibration logic 445 on the second integrated circuit 401. The calibration logic 415 provides adjustment parameters in phase control register 416, which are applied to the early mixer 409 and the late mixer 410 to set the timing with adjustment increments on the order of one picosecond or less.

In the receiver on integrated circuit 401, phase locked loop 425 is adapted to receive the reference clock from the wired interconnect structure 402. The phase locked loop 425 applies its output through divider 426 as feedback, and establishes a plurality of phase-shifted clock signals, or other phase reference signals, on line 427, each having a frequency which is a multiple of the timing reference signal, and preferably evenly spaced in phase (like "k-lines" as described below). The phase-shifted clock signals on line 427 are applied to mixer 428, to output a receive timing signal on line 440. The receive timing signal is applied to Gaussian mono-cycle shaper 429. The mono-cycle shaper 429 is also responsive to the PN code to establish the timing for the generation of a correlation pulse, or correlation pulse train, on line 441 to a correlator 431. An ultra-wideband receiver 430 is also coupled to the correlator 431. The output of the correlator is applied to a sampler 432 which provides the received data out. The receive timing signal from line 440 is applied through delay circuit 433 to the sampler 432, which samples the output of the correlator in response to a delayed version of receive timing signal. Calibration logic 445 in coordination with the calibration logic 415 on the first integrated circuit 400 establishes parameters and stores them in the phase control register 446, which set the amount of phase adjustment in the mixer 428.

The adjustment of the phase of the receive timing signal and the transmit timing signal can be accomplished with very high accuracy using the techniques described above, as published in greater detail in U.S. Pat. Nos. 5,485,490 and 6,125,157. In the approach of U.S. Pat. No. 5,485,490, a VCO in a PLL generates multiple "phase reference signals", PH<11:0>. In some embodiments, just 4 of the phase reference signals are used instead of 12, and the 4 signals are known as "k-lines" labeled K<3:0> in some systems (designed by Rambus, Inc. of Los Altos, Calif. These phase reference signals correspond with the plurality of phase shifted clock signals on lines 408 and 427 mentioned above. A plurality of digitally controlled mixer circuits coupled to the phase reference signals (each utilizing a phase-selection circuit, and a phase-interpolator circuit) generates output signals. One of the output signals being generated with a fixed or pre-programmed phase-control value goes to a phase-detector, which compares it against some precise, externally supplied phase-reference. As is commonly known in the art, the PLL will adjust the VCO's output until this output signal and the reference signal are aligned. Once this adjustment process is complete, every other mixer circuit now has a "baseline" digital reference. That is, if the exact same digital phase value is applied to another mixer, it will generate an output signal that is also phase-aligned to the phase-reference signal. If the digital phase-control is 8-bits, for example, the mixer generates output signals that have 1 of 256 possible precise phase offsets from the reference signal.

In U.S. Pat. No. 6,125,157, an alternative adjustment circuit architecture is described, this time showing k-lines being generated by a delay locked loop DLL instead of a PLL.

Thus in an embodiment of the described circuits and methods, "flex-phase" circuits are used for adjustment characterized by: (1) some k-line phase-reference signals, which are (2) shared by a number of mixers, where (3) each mixer utilizes a digitally-controlled phase-selection circuit and interpolator, and where (4) one of the mixer's outputs is aligned to a specific phase-reference, so as to establish a baseline digital reference value. Other fine delay technologies can be applied for this purpose as well, like that described in U.S. Pat. No. 6,657,468.

An entirely new chip-to-chip wireless architecture and associated integrated circuit devices, computer readable descriptions of such circuits and methods, which can be implemented in very low power environments, with low-cost components are described.

An example embodiment includes a hybrid wireless and wired system in which precise timing and synchronization information is communicated peer-to-peer, from master to slave, or from a central timing reference circuit, over wired interconnect structures, like traditional electrical and opto-electrical interconnects, that operate reliably at reasonable speeds without sophisticated calibration procedures. Data is communicated in the hybrid system wirelessly, and transmission and reception is coordinated between the wireless nodes by the shared timing and synchronization information. Similar to the "RQ" memory bus architecture available from Rambus, Inc., Los Altos Calif., these timing and synchronization signals can be shared by multiple transceiver circuits, allowing simultaneous parallel wireless links, exploiting the large spatial capacity of ultra-wideband systems.

Circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Such data formats in which such descriptions can be implemented include, but are not limited, to formats supporting behavioral languages like C, Verilog, and HLDL, formats supporting register level description languages like RTL, and formats supporting geometry description languages like GDSII, GDSIII, GDSIV, CIF, MEBES and other suitable formats and languages. Data transfers by carrier waves of such files can be done electronically over the diverse media in the Internet or through email, for example. Physical files can be implement on computer readable media such as 4 mm magnetic tape, 8 mm magnetic tape, 3½ inch floppy media, CDs, DVDs and so on.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for wireless communications between a first node and a second node, comprising:
    delivering a timing reference signal via a wired interconnect structure to the first node and the second node;
    transmitting a radio signal in response to the timing reference signal at the first node, the radio signal carrying data;
    receiving the radio signal in response to the timing reference signal at the second node;
    executing a synchronization process to set at least one of a transmit drive point on the first node and a receive sample point on the second node, and including transmitting a control signal related to the synchronization process via a wired interconnect structure between the first and second node; and
    producing a transmit drive signal in response to the timing reference signal at the first node and producing a receive sample signal in response to the timing reference signal at the second node, and adjusting the timing based on the synchronization process of at least one of the transmit drive signal at the first node and the receive sample signal at the second node to coordinate communication between the first and second nodes.
2. The method of claim 1, wherein the radio signal carries data by pulse position modulation.
3. The method of claim 1, wherein the radio signal comprises an ultra-wide band radio signal.
4. The method of claim 1, including adjusting the timing of at least one of the transmit drive signal at the first node and the receive sample signal at the second node in increments of 10 picoseconds or less.
5. The method of claim 1, including adjusting the timing of at least one of the transmit drive signal at the first node and the receive sample signal at the second node in increments of 1 picosecond or less.
6. The method of claim 1, including generating the timing reference signal at one of the first and second nodes.
7. The method of claim 1, wherein the adjusting includes:
    producing a phase locked clock signal in response to the timing reference signal, providing a source for a plurality of phase shifted copies of the phase locked clock signal and selecting one of the plurality of phase shifted copies in response to a control parameter.
8. The method of claim 1, wherein the first and second nodes comprise circuits on first and second integrated circuits which are separated by a distance of less than 2 meters.
9. The method of claim 1, wherein the first and second nodes comprise circuits on first and second integrated circuits which are separated by a distance of less than one half of a meter.
10. The method of claim 1, including transmitting and receiving a plurality of radio signals carrying data in parallel between the first and second nodes in response to the timing reference signal.
11. The method of claim 1, wherein the wired interconnect structure comprises a power supply wire, and including delivering the timing reference signal via the power supply wire.
12. The method of claim 1, including:
    transmitting another radio signal in response to the timing reference signal at the second node, the other radio signal carrying data; and
    receiving the other radio signal in response to the timing reference signal at the first node.
13. The method of claim 1, including
    receiving the radio signal at the second node in response to the timing reference signal in mesochronous synchronization with said transmitting at the first node.
14. A method for wireless communications between a first node and a second node, comprising:
    delivering a timing reference signal via a wired interconnect structure to the first node and the second node;
    transmitting a radio signal in response to the timing reference signal at the first node, the radio signal carrying data; and
    receiving the radio signal in response to the timing reference signal at the second node; including:
    producing a transmit drive signal in response to the timing reference signal at the first node and producing a receive sample signal in response to the timing reference signal at the second node, and adjusting the timing of at least one of the transmit drive signal at the first node and the receive sample signal at the second node, wherein the adjusting includes:
    producing a phase locked clock signal having a frequency greater than 1 GHz in response to the timing reference signal, providing a source for a plurality of phase shifted copies of the phase locked clock signal and selecting one of the plurality of phase shifted copies in response to a control parameter, where the plurality of phase shifted copies includes at least 50 phase shifted copies.
15. A system comprising:
    a first integrated circuit and a second integrated circuit;
    a wired interconnect structure coupled to the first and second integrated circuits; and
    a clock circuit coupled to the wired interconnect structure, the clock circuit transmitting a timing reference signal on the wired interconnect structure; wherein
    the first integrated circuit includes;
    a data source;
    a timing reference signal input adapted to receive the timing reference signal via the wired interconnect structure;

a transmit timing circuit which produces a transmit timing signal in response to the timing reference signal; and a radio transmitter coupled to the transmit timing circuit and the data source which transmits a radio signal carrying data from the data source in response to the transmit timing signal;

logic which executes a synchronization process to set timing for the transmit timing signal for the radio transmitter, the synchronization process including communication of a control signal related to the synchronization process via a wired interconnect structure with the second integrated circuit;

circuitry on the first integrated circuit responsive to the synchronization process to adjust timing of the transmit timing signal to coordinate communication between the first and second integrated circuits; and the second integrated circuit includes:

a timing reference signal input adapted to receive the timing reference signal via the wired interconnect structure;

a receive timing circuit which produces a receive timing signal in response to the timing reference signal; and a radio receiver coupled to the receive timing circuit, wherein the radio receiver receives the radio signal carrying data from the data source in response to the receive timing signal.

16. The system of claim 15, wherein the clock circuit comprises circuitry on one of the first integrated circuit and the second integrated circuit.

17. The system of claim 15, wherein the radio transmitter comprises a pulse position modulation circuit.

18. The system of claim 15, wherein the radio transmitter comprises an ultra-wide band radio transmitter.

19. The system of claim 15, including circuitry to adjust the timing of the transmit timing signal on the first integrated circuit by amounts of 10 picoseconds or less.

20. The system of claim 15, including circuitry to adjust the timing of the transmit timing signal on the first integrated circuit by amounts of 1 picosecond or less.

21. The system of claim 15, wherein the first and second integrated circuits are mounted on a support structure and separated by a distance of less than 2 meters.

22. The system of claim 15, wherein the system includes a circuit board, and the first and second integrated circuits are mounted on the circuit board and separated by a distance of less than one half of a meter.

23. The system of claim 15, wherein the wired interconnect structure includes a power supply wire, and the clock circuit transmits the timing reference signal via the power supply wire.

24. The system of claim 15, including:

a radio receiver on the first integrated circuit; and a radio transmitter on the second integrated circuit.

25. A system comprising:

a first integrated circuit and a second integrated circuit;

a wired interconnect structure coupled to the first and second integrated circuits; and a clock circuit coupled to the wired interconnect structure, the clock circuit transmitting a timing reference signal on the wired interconnect structure; wherein the first integrated circuit includes;

a data source;

a timing reference signal input adapted to receive the timing reference signal via the wired interconnect structure;

a transmit timing circuit which produces a transmit timing signal in response to the timing reference signal; and a radio transmitter coupled to the transmit timing circuit and the data source which transmits a radio signal carrying data from the data source in response to the transmit timing signal;

logic which executes a synchronization process to set timing for the transmit timing signal for the radio transmitter, the synchronization process including communication of a control signal related to the synchronization process via a wired interconnect structure with the second integrated circuit; and the second integrated circuit includes:

a timing reference signal input adapted to receive the timing reference signal via the wired interconnect structure;

a receive timing circuit which produces a receive timing signal in response to the timing reference signal; and a radio receiver coupled to the receive timing circuit, wherein the radio receiver receives the radio signal carrying data from the data source in response to the receive timing signal; and circuitry responsive to the synchronization process to adjust timing of the receive timing signal to coordinate communication between the first and second integrated circuits.

26. The system of claim 25, including circuitry to adjust the timing of the receive timing signal on the second integrated circuit by amounts of 10 picoseconds or less.

27. The system of claim 25, including circuitry to adjust the timing of the receive timing signal on the second integrated circuit by amounts of 1 picosecond or less.

28. A system comprising:

a first integrated circuit and a second integrated circuit;

a wired interconnect structure coupled to the first and second integrated circuits; and a clock circuit coupled to the wired interconnect structure, the clock circuit transmitting a timing reference signal on the wired interconnect structure; wherein the first integrated circuit includes;

a data source;

a timing reference signal input adapted to receive the timing reference signal via the wired interconnect structure;

a transmit timing circuit which produces a transmit timing signal in response to the timing reference signal; and a radio transmitter coupled to the transmit timing circuit and the data source which transmits a radio signal carrying data from the data source in response to the transmit timing signal; and the second integrated circuit includes:

a timing reference signal input adapted to receive the timing reference signal via the wired interconnect structure;

a receive timing circuit which produces a receive timing signal in response to the timing reference signal; and a radio receiver coupled to the receive timing circuit, wherein the radio receiver receives the radio signal carrying data from the data source in response to the receive timing signal; including circuitry to adjust the timing of the transmit timing signal on the first integrated circuit, including:

a phase locked loop which produces a phase locked clock signal in response to the timing reference signal, a mixer which provides a source for a plurality of phase shifted copies of the phase locked clock signal, and selection circuitry to select one of the plurality of phase shifted copies in response to a control parameter.

29. A system comprising:

a first integrated circuit and a second integrated circuit;

a wired interconnect structure coupled to the first and second integrated circuits; and a clock circuit coupled to the wired interconnect structure, the clock circuit transmitting a timing reference signal on the wired interconnect structure; wherein the first integrated circuit includes;
  a data source;
  a timing reference signal input adapted to receive the timing reference signal via the wired interconnect structure;
  a transmit timing circuit which produces a transmit timing signal in response to the timing reference signal; and
  a radio transmitter coupled to the transmit timing circuit and the data source which transmits a radio signal carrying data from the data source in response to the transmit timing signal; and the second integrated circuit includes:
  a timing reference signal input adapted to receive the timing reference signal via the wired interconnect structure;
  a receive timing circuit which produces a receive timing signal in response to the timing reference signal; and
  a radio receiver coupled to the receive timing circuit, wherein the radio receiver receives the radio signal carrying data from the data source in response to the receive timing signal; including circuitry to adjust the timing of the transmit timing signal on the first integrated circuit, including:
  a phase locked loop which produces a phase locked clock signal having a frequency of at least 1 GHz in response to the timing reference signal,
  a mixer which provides a source for a plurality of phase shifted copies of the phase locked clock signal, the plurality of phase shifted copies including at least 50 phase shifted copies, and
  selection circuitry to select one of the plurality of phase shifted copies in response to a control parameter.

30. A system comprising:
  a first integrated circuit and a second integrated circuit;
  a wired interconnect structure coupled to the first and second integrated circuits; and
  a clock circuit coupled to the wired interconnect structure, the clock circuit transmitting a timing reference signal on the wired interconnect structure; wherein the first integrated circuit includes;
  a data source;
  a timing reference signal input adapted to receive the timing reference signal via the wired interconnect structure;
  a transmit timing circuit which produces a transmit timing signal in response to the timing reference signal; and
  a radio transmitter coupled to the transmit timing circuit and the data source which transmits a radio signal carrying data from the data source in response to the transmit timing signal; and the second integrated circuit includes:
  a timing reference signal input adapted to receive the timing reference signal via the wired interconnect structure;
  a receive timing circuit which produces a receive timing signal in response to the timing reference signal; and
  a radio receiver coupled to the receive timing circuit, wherein the radio receiver receives the radio signal carrying data from the data source in response to the receive timing signal; including circuitry to adjust the timing of the receive timing signal on the second integrated circuit, including:
  a phase locked loop which produces a phase locked clock signal in response to the timing reference signal,
  a mixer which provides a source for a plurality of phase shifted copies of the phase locked clock signal, and
  selection circuitry to select one of the plurality of phase shifted copies in response to a control parameter.

31. A system comprising:
  a first integrated circuit and a second integrated circuit;
  a wired interconnect structure coupled to the first and second integrated circuits; and
  a clock circuit coupled to the wired interconnect structure, the clock circuit transmitting a timing reference signal on the wired interconnect structure; wherein the first integrated circuit includes;
  a data source;
  a timing reference signal input adapted to receive the timing reference signal via the wired interconnect structure;
  a transmit timing circuit which produces a transmit timing signal in response to the timing reference signal; and
  a radio transmitter coupled to the transmit timing circuit and the data source which transmits a radio signal carrying data from the data source in response to the transmit timing signal; and the second integrated circuit includes:
  a timing reference signal input adapted to receive the timing reference signal via the wired interconnect structure;
  a receive timing circuit which produces a receive timing signal in response to the timing reference signal; and
  a radio receiver coupled to the receive timing circuit, wherein the radio receiver receives the radio signal carrying data from the data source in response to the receive timing signal; including circuitry to adjust the timing of the receive timing signal on the second integrated circuit, including:
  a phase locked loop which produces a phase locked clock signal having a frequency of at least 1 GHz in response to the timing reference signal,
  a mixer which provides a source for a plurality of phase shifted copies of the phase locked clock signal, the plurality of phase shifted copies including at least 50 phase shifted copies, and
  selection circuitry to select one of the plurality of phase shifted copies in response to a control parameter.

32. A system comprising:
  a first integrated circuit and a second integrated circuit mounted on a support structure and separated by a distance of less than 10 meters;
  a wired interconnect structure coupled to the first and second integrated circuits; and
  a clock circuit coupled to the wired interconnect structure transmitting a timing reference signal on the wired interconnect structure; wherein the first integrated circuit includes;
  a data source;
  a timing reference signal input adapted to receive the timing reference signal via the wired interconnect structure;
  a transmit timing circuit which produces a transmit timing signal in response to the timing reference signal, including circuitry to adjust the timing of the transmit timing signal by amounts of 10 picoseconds or less to synchronize communication between the first and second integrated circuits;
  logic coupled with the transmit timing circuit which executes a synchronization process to set the timing for the transmit timing signal for the radio transmitter, the synchronization process including communication of a control signal related to the synchronization process via the wired interconnect structure with the second integrated circuit; and
  a radio transmitter coupled to the transmit timing circuit and the data source which transmits an ultra-wide band impulse radio signal carrying data from the data source in response to the transmit timing signal; and the second integrated circuit includes:
  a timing reference signal input adapted to receive the timing reference signal via the wired interconnect structure;
  a receive timing circuit which produces a transmit timing signal in response to the timing reference signal; and
  a radio receiver coupled to the receive timing circuit which receives the ultra-wide band impulse radio signal carrying data from the data source in response to the receive timing signal.

* * * * *